US012367036B2

(12) United States Patent
Engel et al.

(10) Patent No.: US 12,367,036 B2
(45) Date of Patent: Jul. 22, 2025

(54) METHOD AND SYSTEM FOR TESTING AT LEAST ONE ELECTRONIC CONTROL DEVICE AS A VIRTUAL CONTROL DEVICE ON A SIMULATOR, AND CORRESPONDING SIMULATOR

(71) Applicant: dSPACE GmbH, Paderborn (DE)

(72) Inventors: Felix Engel, Paderborn (DE); Andre Hildebrandt, Paderborn (DE)

(73) Assignee: dSPACE GMBH, Paderborn (DE)

( * ) Notice: Subject to any disclaimer, the term of this patent is extended or adjusted under 35 U.S.C. 154(b) by 114 days.

(21) Appl. No.: 18/372,340

(22) Filed: Sep. 25, 2023

(65) Prior Publication Data

US 2024/0103855 A1 Mar. 28, 2024

(30) Foreign Application Priority Data

Sep. 23, 2022 (EP) ..................................... 22197283

(51) Int. Cl.
*G06F 8/71* (2018.01)
(52) U.S. Cl.
CPC ...................................... *G06F 8/71* (2013.01)
(58) Field of Classification Search
CPC ........................................................ G06F 8/71
See application file for complete search history.

(56) References Cited

U.S. PATENT DOCUMENTS

| | | | | |
|---|---|---|---|---|
| 7,743,012 B2 * | 6/2010 | Chambers | ............ | H04N 21/254 |
| | | | | 709/220 |
| 9,152,540 B2 * | 10/2015 | Xie | ...................... | G06F 11/3676 |
| 9,195,784 B2 * | 11/2015 | Tseng | ................... | G06F 30/3312 |
| 10,481,931 B2 | 11/2019 | Holler et al. | | |
| 10,509,870 B2 * | 12/2019 | Kephart | .................. | G05B 17/02 |
| 10,757,244 B2 * | 8/2020 | Colston | ............... | H04W 68/005 |
| 11,137,745 B2 * | 10/2021 | Nixon | ................. | G05B 19/4183 |

(Continued)

FOREIGN PATENT DOCUMENTS

| CN | 104460646 A | 3/2015 |
|---|---|---|
| CN | 107784152 A | 3/2018 |

(Continued)

OTHER PUBLICATIONS

Extended European Search Report dated Mar. 20, 2023 in corresponding application 22197283.9.

(Continued)

*Primary Examiner* — Douglas M Slachta
(74) *Attorney, Agent, or Firm* — Muncy, Geissler, Olds & Lowe, P.C.

(57) ABSTRACT

A method for testing at least one electronic control device as a virtual control device on a simulator, which includes at least one simulator computing unit. The electronic control device has a hardware configuration with at least one computing unit (and an external interface for exchanging data. A software configuration is assigned to the hardware configuration. The electronic control device is mapped to the virtual control device in that the internal functionality of the software configuration of the electronic control device is taken over as the internal functionality of a software configuration of the virtual control device. External interface functionality of the electronic control device is replaced by a data transfer functionality of the software configuration of the simulator computing unit. The software configuration of the virtual control device being translated into executable code for the simulator computing unit and executed on the simulator.

12 Claims, 5 Drawing Sheets

(56) References Cited

U.S. PATENT DOCUMENTS

| | | | |
|---|---|---|---|
| 11,314,499 B2* | 4/2022 | Musani | G06F 11/362 |
| 2007/0282587 A1* | 12/2007 | Sato | G06F 30/20 |
| | | | 703/17 |
| 2009/0327630 A1* | 12/2009 | Akamatsu | G06F 11/1451 |
| | | | 711/E12.001 |
| 2013/0103379 A1 | 4/2013 | Nam et al. | |
| 2014/0088946 A1 | 3/2014 | Schumpelt et al. | |
| 2015/0082289 A1 | 3/2015 | Leinfellner et al. | |
| 2018/0060456 A1 | 3/2018 | Phatak et al. | |
| 2019/0034318 A1* | 1/2019 | Mariasin | G06F 11/3698 |
| 2022/0035541 A1* | 2/2022 | Genereux | G06F 3/067 |
| 2024/0011871 A1* | 1/2024 | Hildebrandt | G01M 17/007 |

FOREIGN PATENT DOCUMENTS

| | | |
|---|---|---|
| CN | 111338753 A | 6/2020 |
| CN | 114930303 A | 8/2022 |
| DE | 102013212839 A1 | 1/2015 |
| EP | 3285165 A1 | 2/2018 |
| WO | WO 2021189011 A1 | 9/2021 |

OTHER PUBLICATIONS

DSpace GmbH; "VEOS Platform for PC-based simulation of models and ECU network communication", Feb. 2020.

Urbina et al; "Simulation Environment based on SystemC and VEOS for Multi-Core Processors with Virtual AUTOSAR ECUs", 2015 IEEE International Conference on Computer and Inforamtion Technology; Ubiquitous Computing and Communications; Dependable, Auonomic and Secure Computing; Pervasive Intelligence and Computing.

Urbina et al;"Co-simulation Framework for AUTOSAR Multi-Core Processors with Message-based Network-on-Chips", 2016.

* cited by examiner

METHOD AND SYSTEM FOR TESTING AT LEAST ONE ELECTRONIC CONTROL DEVICE AS A VIRTUAL CONTROL DEVICE ON A SIMULATOR, AND CORRESPONDING SIMULATOR

This nonprovisional application claims priority under 35 U.S.C. § 119(a) to European Patent Application No. 22197283.9, which was filed on Sep. 23, 2022, and which is herein incorporated by reference.

BACKGROUND

Field of the Invention

The present invention relates to a method for testing at least one electronic control device as a virtual control device on a simulator, which includes at least one simulator computing unit, the electronic control device having a hardware configuration with at least one computing unit and an external interface for exchanging data, and a software configuration assigned to the hardware configuration, the software configuration comprising an internal functionality and an external interface functionality, the electronic control device being mapped to the virtual control device in that the internal functionality of the software configuration of the electronic control device is taken over as the internal functionality of a software configuration of the virtual control device, and in that the external interface functionality of the electronic control device is replaced by a data transfer functionality of the software configuration of the simulator computing unit, the software configuration of the virtual control device being translated into executable code for the simulator computing unit and executed on the simulator. The invention furthermore relates to a system for testing at least one electronic control device as a virtual control device on a simulator, the system comprising the simulator as well as a hardware configuration and a software configuration of the electronic control device assigned to the hardware configuration, the simulator comprising at least one simulator computing unit, the hardware configuration of the electronic control device comprising at least one computing unit and an external interface for exchanging data, the software configuration comprising an internal functionality and an external interface functionality, the electronic control device being mapped to the virtual control device by the simulator in that the internal functionality of the software configuration of the electronic control device is taken over as the internal functionality of a software configuration of the virtual control device, and in that the external interface functionality of the electronic control device is replaced by a data transfer functionality of a software configuration of the simulator computing unit, the software configuration of the virtual control device being translated into executable code for the simulator computing unit and executed on the simulator in the operating state of the simulator. In addition, the invention also relates to a corresponding simulator and a relevant computer program.

Description of the Background Art

Methods and systems of the type described above are used in the area of control device development, more specifically in the area of developing and testing software for control devices. Control devices are microcomputers having an external interface, the control device being operatively connected to a technical physical process via this external interface and/or also being communicatively connected to other control devices; from the perspective of the control device, data may thus be exchanged in the transmit and receive directions via the external interface. The external interface may be a very simple process interface for the purpose of exclusively exchanging measuring data, for example an analog current interface or a digital PWM interface; however, it may also be an advanced communication interface, which implements, for example, a (field) bus protocol (e.g., CAN, TTP, FlexRay, Ethernet). The external interface may have a plurality of the interface functionalities mentioned. The external interface of the hardware configuration is operated in software by means of the external interface functionality of the software configuration of the control device.

Received signals or messages are prepared by the computing unit of the control device, analyzed, further processed, for example by a regulating algorithm, and corresponding calculated variables are then output via the external interface as control device output variables. This functionality of the software configuration of the control device, which is essentially connected to the functionality implemented by the computing unit, is referred to here as the internal functionality. Electronic control devices have many different fields of application, for example in the automotive sector, in aerospace engineering, and in industrial applications in general, for example in the process industry. In the case of electronic control devices still in common use at present, the computing unit is usually a microcontroller, a digital signal processor, to some extent also programmable circuit structures, for example in the form of field programmable gate arrays (FPGA).

The software development for control devices is often mapped in the so-called V cycle. In the V cycle, different development stages are passed through, starting with an abstract function test, for example a regulation algorithm, without any reference to the later control device hardware (model in the loop), via the testing of a program code for the series control device to be used later on, which is of interest here, the series control device, however, not yet being present but only mapped in software as a virtual control device (software in the loop, SiL), via the testing of the physically present series control device, including the series control device program code, in a fully or partially simulated environment (hardware in the loop, HiL), and finally to the testing of the series control device in the actual physical environment. This is a standard chain of development steps established in the industry, which has proven to be successful for the purpose of reliably developing and intensively testing software for electronic control devices.

The applicant supports the various stations of the V cycle with corresponding hardware and software tools. The method, system, and simulator examined here involve the application of the software-in-the-loop test, which the application supports with the VEOS environment (see product brochure "VEOS Platform for PC-Based Simulation of Models and ECU Network Communication," February 2020, dSPACE GmbH), which is incorporated by reference.

The electronic control device is mapped to the virtual control device in that the internal functionality of the software configuration of the electronic control device is taken over as the internal functionality of a software configuration of the virtual control device: Within the scope of the testing of the virtual control device the program code intended for the electronic control device is actually tested by an execution of the program code on the simulator computing unit after it has been compiled for the simulator computing unit.

The external interface functionality of the electronic control device, which is thus in correlation with the external interface of the electronic control device, is furthermore replaced by a data transfer functionality of the software configuration of the simulator computing unit, the software configuration of the virtual control device being translated into executable code for the simulator computing unit and executed on the simulator. This may mean, for example, that the transmission of a CAN bus message, i.e., the call of an eternal interface functionality of the electronic control device, is replaced by a corresponding write command to the area of a shared memory, which may be accessed by the software-implemented virtual control unit on the simulator computing unit as well as the—likewise software-implemented—communication partner, which is not discussed in greater detail here. This means that calls of driver components of the external interface on the real electronic control device are not transferred to the virtual control device on the simulator, but are replaced by the data transfer functionality of the software configuration of the simulator computing unit.

If multiple electronic control devices are to be tested, for example because they jointly form the vehicle electrical system in question of a motor vehicle, where they interact with each other, each of the control devices is then described by a hardware configuration and a software configuration, i.e., simply by the description of the existing hardware components and the software components assigned to them. Each of the electronic control devices is then mapped to a virtual control device on the simulator. Each of the different virtual control devices forms its own unit in software on the simulator, while they may also be executed, for example, on the same simulator computing unit of the simulator. It is also possible that different virtual control devices are calculated on different simulator computing units of the simulator, if the simulator includes multiple computing units (for example, multiple processor modules, multiple kernels of a processor). Depending on the technical implementation, the data transfer functionality also changes, with which the different virtual control devices may exchange information with each other on the simulator. This procedure has various advantages, in particular because the structure of the group of electronic control devices to be tested in the real world remains the same in the virtual world of the simulator and the virtual control devices implemented there.

Control devices are increasingly being used, which have a much more complicated hardware structure and include, for example, not only a microcontroller or a digital signal processor and an external interface, but also include a multiplicity of different computing units, which are based on entirely different technologies and are also frequently implemented in an integrated manner as a system on chip (SoC).

SUMMARY OF THE INVENTION

It is therefore an object of the present invention to provide an automatic testing possibility for electronic control devices of this type, including various computing units of different types, which easily and automatically permits the handling of a complex hardware structure and transfer of this structure to a simulator.

In the case of the method described at the outset for testing at least one electronic control device as a virtual control device on a simulator including at least one simulator computing unit, the object is achieved in that the hardware configuration of the electronic control unit includes at least one first computing unit and a second computing unit of different types, the software configuration comprises at least internal functionalities for the first computing unit and the second computing unit, at least the internal functionality of the first computing unit calling an internal function of the internal functionality of the second computing unit. In the present application, it is important that the different computing units of the electronic control device make use of each other, i.e., that they use and call the internal functionality made available by the particular computing unit.

It could be, for example, that the first computing unit is a "normal" CPU, for example an ARM-CPU of the Cortex A type. This CPU makes use of the internal functionality of the second computing unit, which is, for example, a matrix accelerator. In this regard, therefore, two computing units of different types are present. In other words, this means that a data exchange between the first computing unit and the second computing unit takes place, the first computing unit, for example, tells the second computing unit which data the second computing unit should use to carry out which function, and the second computing unit returns the result of this application of its internal functionality to the first computing unit as the result.

According to the invention, it is furthermore provided that a description of the hardware configuration and the software configuration of the electronic control device is provided, including the assignment of the internal functionalities to the computing units and the internal functionalities themselves. This means nothing more than that the description names the components of the hardware configuration of the control device as a whole, and the description also names the software configuration in the form of the internal functionalities on the particular computing units of the hardware configuration of the control device, so that it is clear which components of the hardware configuration are being used and which components of the software configuration or which internal functionalities are provided there for execution.

Each computing unit of each type can have an assigned internal functionality mapped to a virtual computing subunit of the corresponding type by evaluating the description of the electronic control device, the internal functionality of the mapped computing unit being transferred to a internal functionality of the virtual computing subunit executable on the simulator computing unit. The concept of the virtual computing subunit makes it clear that, from the user's perspective, the electronic control device continues to be transferred by the method to a single virtual control device, which, however, includes virtual computing subunits which take into account the circumstance that the electronic control device includes a plurality of computing units. This pursues the goal of continuing to make available to the user a structurally identical map of the complex electronic control device on the simulator, despite the complicated structure of the electronic control device including a plurality of computing units.

Further, by evaluating the provided internal functionalities of the first computing unit and the second computing unit, it is ascertained which computing units are exchanging data with each other by accessing an internal functionality of another computing unit, and the accesses to internal functions of another computing unit are replaced by a data transfer functionality of the software configuration of the simulator computing unit. The prerequisite here is that the internal functionalities possessed by the different computing units are generally known in the evaluation step. Depending on the type of computing unit, the corresponding syntax of the software configuration of the particular computing unit must be known in the evaluation step. Depending on the format of the software configuration of the particular computing unit, the syntax of the internal functionality on the high-level language programming level or possibly also in the binary code, etc. must be known in the evaluation.

In the case of the system described at the outset, the object is correspondingly achieved in that the hardware configuration of the electronic control device includes at least one first computing unit and a second computing unit of different types, the software configuration of the electronic control device comprises at least internal functionalities for the first computing unit and the second computing unit, at least the internal functionality of the first computing unit calling an internal function of the internal functionality of the second computing unit, the simulator receives a description of the hardware configuration and the software configuration of the electronic control device, including the assignment of the internal functionalities of the software configuration of the electronic control device to the computing units of the electronic control device and the internal functionalities of the computing units of the electronic control device itself, the simulator maps each computing unit of each type of the electronic control device, including an assigned internal functionality, to a virtual computing subunit of the corresponding type by evaluating the description of the electronic control device, the internal functionality of the electronic control device of the mapped computing unit being transferred to an internal functionality of the virtual computing subunit executable on the simulator computing unit, and, by evaluating the provided internal functionalities of the first computing unit of the electronic control device and the second computing unit of the electronic control device, the simulator ascertains which computing units of the electronic control device are exchanging data with each other by accessing an internal function of another computing unit of the electronic control device and replaces the accesses to internal functions of another computing unit in the virtual control device with a data transfer functionality of the software configuration of the simulator computing unit.

The invention is correspondingly achieved by the simulator of the system which carries out the described method.

As a result, by carrying out the method, the system, and the simulator according to the invention, it is possible to automatically map a control device having a complex hardware configuration which comprises multiple computing units to a virtual control device which has a complex internal structure with multiple virtual computing subunits, the user of the automatically carried-out method does not his/herself have to take charge of the complex and also error-prone transfer of the complex internal structure of the real control device to corresponding components of a virtual control device. With the aid of the method, it is possible to check whether the program code—specifically the program code—which implements the internal functionality of the electronic control device has the expected functionality and the expected behavior without the electronic control device actually being present. In a further method step, the behavior of the internal functionality on the virtual computing subunit may be compared with the expected behavior and, if the actual behavior deviates from the expected behavior, the deviation is signaled to the outside by the simulator and possibly also documented by a log.

The different types of computing units of the real control device may be, for example, processors (CPU), microcontrollers (μC), graphics processors (GPU), field programmable gate arrays (FPGA), neural network accelerators (NNA), matrix accelerators (MACC), and security chips (for example, for cryptographic functionalities, key databases, etc.).

In the method, system, and simulator, multiple computing units of an identical type of the electronic control device may be mapped to precisely one virtual computing subunit of this type, in particular all computing units of the identical type of the electronic control device are mapped to precisely one virtual computing subunit of this type. This means, for example, that multiple graphics processors of the electronic control device are mapped to one virtual computing subunit, which may contribute to an improved clarity of the structure of the virtual overall control device as well as to a more economical implementation of the virtual control device (smaller code scope, fewer simulation modules needed).

The transfer of the internal functionality of the mapped computing unit of the electronic control device to an internal functionality of the virtual computing subunit executable on the simulator computing unit can comprise the use of a simulation module which may run on the simulator computing unit for the mapped computing unit of the electronic control device. For example, they may be simulation modules which are frequently provided by the manufacturers of the real computing units of the electronic control device, for example within the scope of the software development kit (SDK) of the particular computing unit. In this case, in particular, a good option is to map multiple computing units of the identical type of the electronic control device to exactly one virtual computing subunit of this type, so that multiple instances of a simulation module do not have to be operated in parallel (and possibly also purchased and licensed).

The internal function of the internal functionality of the second computing unit called by the internal functionality of the first computing unit can relate to the loading or storage of data from or to the memory area of the second computing unit.

The evaluation of the provided internal functionalities of the first computing unit and the second computing unit can take place on the basis of the binary code of the internal functionalities executable on the electronic control device and/or on the basis of the high-level language source code of the internal functionalities. The evaluation can take place automatically by a corresponding syntax analysis of the corresponding binary code or the high-level language source code.

Each virtual computing subunit can be represented as a block for a computer-based graphical simulation environment, in particular for a computer based graphical simulator environment of the simulator, i.e., as a block of a signal flow chart in the form of a block diagram.

In connection with the representation of virtual computing subunits as blocks, it can be provided that the blocks of the virtual computing units, whose computing units have been recognized as being connected to each other for exchanging data, are identified by data transfer ports at the corresponding blocks, the data transfer being identified by a signal line connecting the data transfer ports of the virtual computing units. This results in an intuitive understanding of the effective relationship between different virtual computing subunits, as the user is accustomed to from block diagrams.

The object is also achieved by a computer program, which comprises commands, which, when the program is executed by a simulator computing unit of a simulator, prompt the latter to carry out the method illustrated above for testing a virtual control device.

Specifically, a multiplicity of possibilities now exist for embodying and refining the method according to the invention, the system according to the invention, and the simulator according to the invention. For this purpose, reference is made, on the one hand, to the patent claims which are subordinate to the independent patent claims and, on the other hand, to the following description of exemplary embodiments in connection with the drawing.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
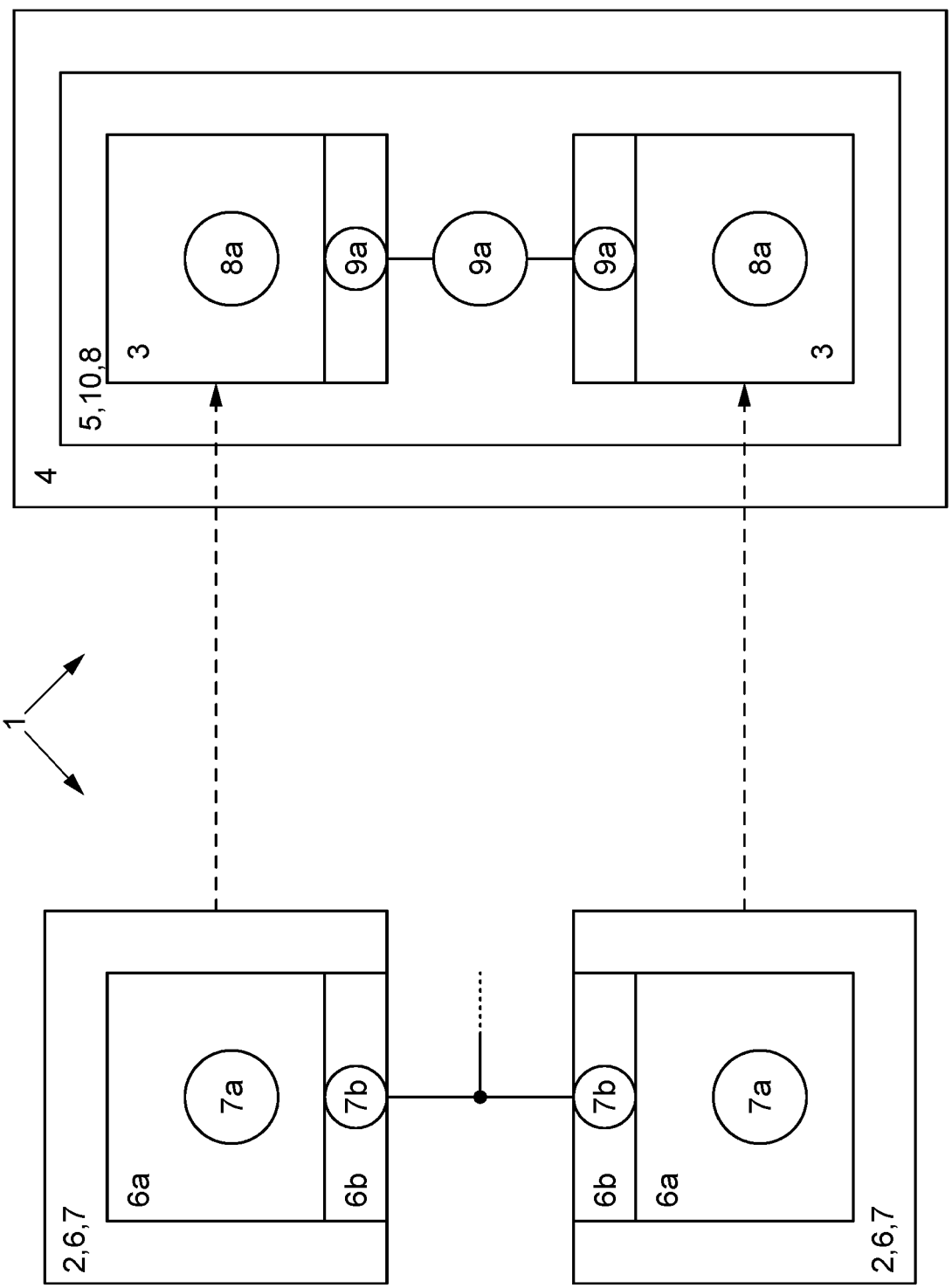
FIG. 1 schematically shows a method, a system, and a simulator for testing an electronic control device as a virtual control device, each electronic control device including only one computing unit.

A method 1 for testing at least one electronic control device 2 as a virtual control device 3 on a simulator 4, which includes at least one simulator computing unit 5, is illustrated in its entirety or only in different aspects in FIGS. 1 through 5. A corresponding system 4, 6, 7 and a corresponding simulator 4 are likewise and similarly depicted. Everything discussed below in relation to method 1 applies equally and similarly to system 4, 6, 7 and simulator 4 as well.

Method 1 comprises not only the testing of virtual control device 3 on simulator 4 but also the preceding steps for obtaining real electronic control device 2 as virtual control device 3 in the first place. The goal is to at least partially test the software of real electronic control device 2 on simulator 4, which generally has nothing to do with the hardware of control device 2; in the simplest case, simulator 4 may be a PC. This is, however, precisely the interesting special feature of test method 1 described here, namely that the software of series control device 2—which may possibly exist only at a much later point in time—may be tested in advance even without the original hardware of control device 2.

In any case, electronic control device 2 has a hardware configuration 6 with a computing unit 6a and an external interface 6b for exchanging data with communication partners outside control device 2 as well as a software configuration 7 assigned to hardware configuration 6. Hardware configuration 6 and assigned software configuration 7 are thus the hardware and software equipment features of electronic control device 2.

FIG. 1 shows the simple case that the two illustrated electronic control devices 2 each include only one single computing unit 6a. The fact that further control devices 2 may also be present, as is common, for example, in a control device network in a motor vehicle, is also indicated. Control devices 2 themselves and the components of control devices 2 are each identified by identical reference numerals, which, however, is of no importance here, as the relevant meaning is readily apparent.

Software configuration 7 comprises an internal functionality 7a and an external interface functionality 7b. The two electronic devices 2 are communicatively connected to each other via their particular external interfaces 6b.

Electronic control device 2 is mapped to virtual control device 3 (dashed lines running from left to right in FIG. 1) in that internal functionality 7a of software configuration 7 of electronic control device 2 is taken over as internal functionality 8a of a software configuration 8 of virtual control device 3. If computing unit 6a of control device 2 is a microcontroller, whose internal functionality 7a, for example a regulation algorithm, is present in C code, and if simulator computing unit 5 of simulator 4 is an x86 processor, it is possible to take over the C code of control device 2, namely in that the C code for the target hardware, i.e., the x86 processor of simulator 4, is compiled, by which means internal functionality 7a of control device 2 may, in fact, be tested without changes with the aid of virtual control device 3.

Electronic control device 2 is furthermore mapped to virtual control device 3 in that external interface functionality 7b of electronic control device 2 is replaced by a data transfer functionality 9a of a software configuration 10 of simulator computing unit 5, software configuration 8 of virtual control device 3 being translated into executable code for simulator computing unit 5 and executed on simulator 4. In the case illustrated in FIG. 1, external interface functionality 7b of electronic control device 2 is the driver functionality of a serial field bus according to the CAN standard (Controller Area Network). This functionality is not transferred to simulator 4, because its hardware equipment does not have a relevant feature. Software for exchanging data can be used as a replacement, which are present on simulator 4: This is data transfer functionality 9a of software configuration 10 of simulator computing unit 5, which is present here in the use of a shared memory approach, cf. FIG. 1, right.

In any case, the translation of software configuration 8 of virtual control device 3 into executable code for simulator computing unit 5 and the execution of the code on simulator 4 make it possible to test internal functionality 7a of control device 2 without control device 2 actually being present. The results achieved on simulator 4 during the execution of the code may be compared with the expected behavior, and deficiencies in internal functionality 7a of software configuration 7 of electronic control device 2 may thus be revealed—even automatically.

Figure 2:
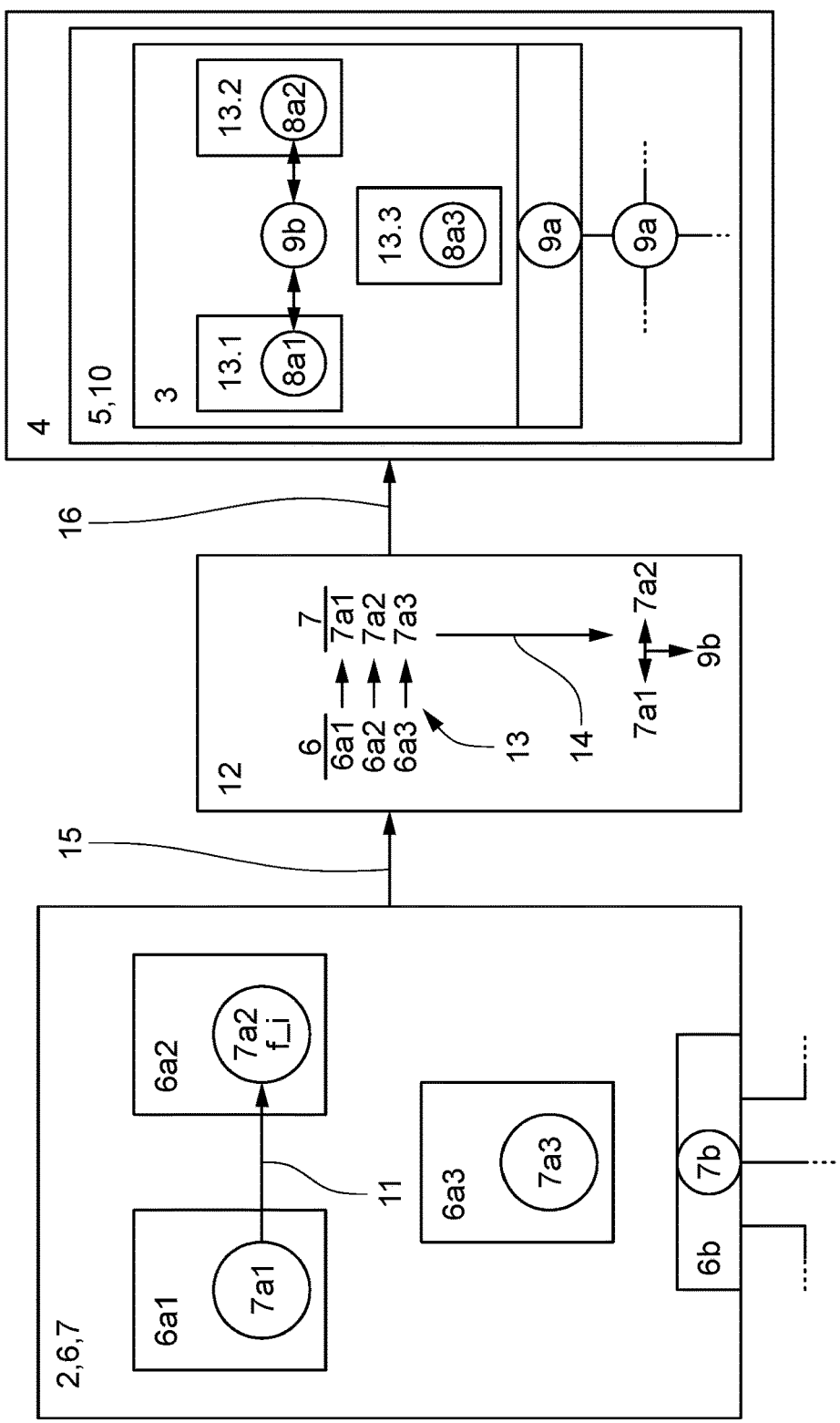
FIG. 2 schematically shows the method, system, and simulator according to the invention for testing an electronic control device as a virtual device, the electronic control device including multiple computing units and being automatically structurally mapped to the virtual control device.

FIG. 2 now shows the more complex and above all interesting case that hardware configuration 6 of electronic control device 2 includes at least one first computing unit 6a1, a second computing unit 6a2, and also a third computing unit 6a3 of different types; what is important is only that more than one computing unit is present. This is increasingly the case in modern control device architectures, and the trend is toward concentrating computing capacities on a circuit board, not uncommonly even on a complex chip, so-called system-on-chip approaches (SoC). In running the test, the user of method 1 for testing a complex electronic control device 2 would like to work only with "the" electronic control device 2, with its outer boundary in the form of external interface 6b, regardless of the complexity of the internal structure or the complexity of hardware configuration 6 of electronic control device 2.

Multiple computing units 6a1, 6a2, 6a3 of electronic control device 2 go along with the fact that software configuration 7 of electronic control device 2 comprises at least internal functionalities 7a1, 7a2, 7a3 for first computing unit 6a1 and second computing unit 6a2 and, of course, also for third computing unit 6a3, at least internal functionality 7a1 of first computing unit 6a1 calling 11 an internal function f_i of internal functionality 7a2 of second computing unit 6a2. Therefore, there is no longer only a data exchange with external communication partners of control device 2 but also a data exchange between the multiple computing units 6a1, 6a2 of control device 2.

In method 1, it is furthermore provided that a description 12 of hardware configuration 6 and software configuration 7 of electronic control device 2, including assignment 13 of internal functionalities 7a1, 7a2, 7a3 of software configuration 7 of electronic device 2 to computing units 6a1, 6a2, 6a3 of electronic control device 2, is provided 15, and also internal functionalities 7a1, 7a2, 7a3 of computing units 6a1, 6a2, 6a3 of electronic control device 2 itself are provided 15.

According to the method, it is additionally provided that, by evaluating description 12 of electronic control device 2, each computing unit 6a1, 6a2, 6a3 of each type of electronic control device 2, including an assigned internal functionality 7a1, 7a2, 7a3, is mapped 16 to a virtual computing subunit 13.1, 13.2, 13.3 of the corresponding type, internal functionality 7a1, 7a2, 7a3 of mapped computing unit 6a1, 6a2, 6a3 of electronic control device 2 being transferred to an internal functionality 8a1, 8a2, 8a3 of virtual computing subunit 13.1, 13.2, 13.2 executable on simulator computing unit 5.

Finally, by evaluating 14 provided internal functionalities 7a1, 7a2, 7a3 of first computing unit 6a1 of electronic control device 2 and second computing unit 6a2 of electronic control device 2—and, in the example according to FIG. 2, also with the aid of third computing unit 6a3 of electronic control device 2—it is ascertained which computing units 6a1, 6a2, 6a3 of electronic control device 2 are exchanging data with each other by accessing an internal function f_i of another computing unit 6a1, 6a2, 6a3 of electronic control device 2. Accesses 11 to internal functions f_i of another computing unit 6a1, 6a2, 6a3 are replaced in virtual control device 3 by an (internal) data transfer functionality 9b of software configuration 7 of simulator computing unit 5.

As a result, due to an automated method, a corresponding virtual control device 3 including computing subunits 13.1, 13.2 13.3 with an (internal) data transfer functionality 9b of software configuration 7 of simulator computing unit 5 is now created in a complex control device 2, of whose implementation the user does not have to actively take charge.

Figure 3:
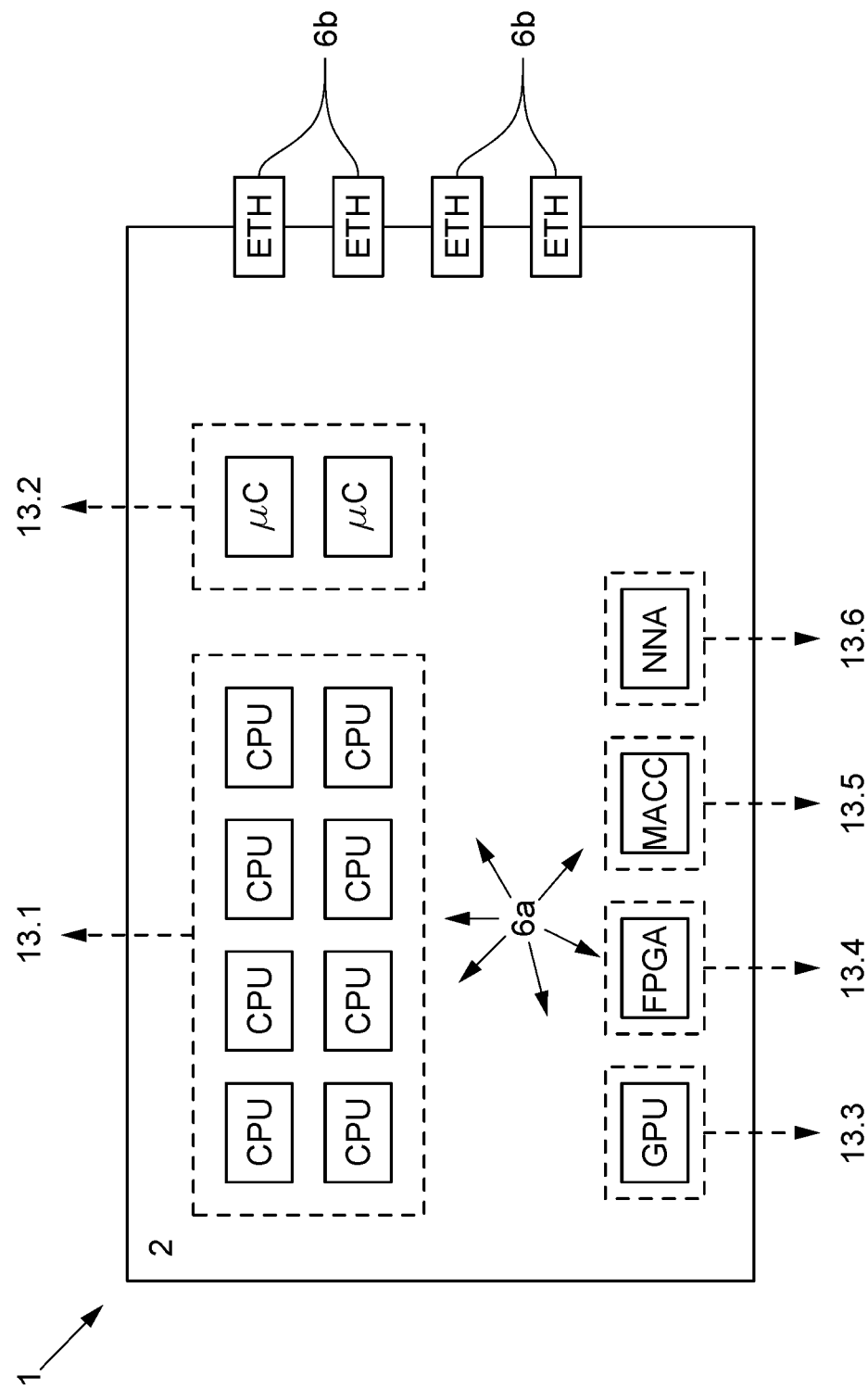
FIG. 3 schematically shows a complex electronic control device, including different types of computing units.

A complex electronic control device 2 including different types of computing units 6a is shown in FIG. 3; in the present case, these are processors (CPU), microcontrollers (μC), graphics processors (GPU), field programmable gate arrays (FPGA), neural network accelerators (NNA), and matrix accelerators (MACC). Control device 2 further includes a plurality of external interfaces 6b in the form of Ethernet interfaces (ETH), which provide a corresponding bandwidth to be able to manage the possibly high data transfer from and to computing units 6a.

Figure 4:
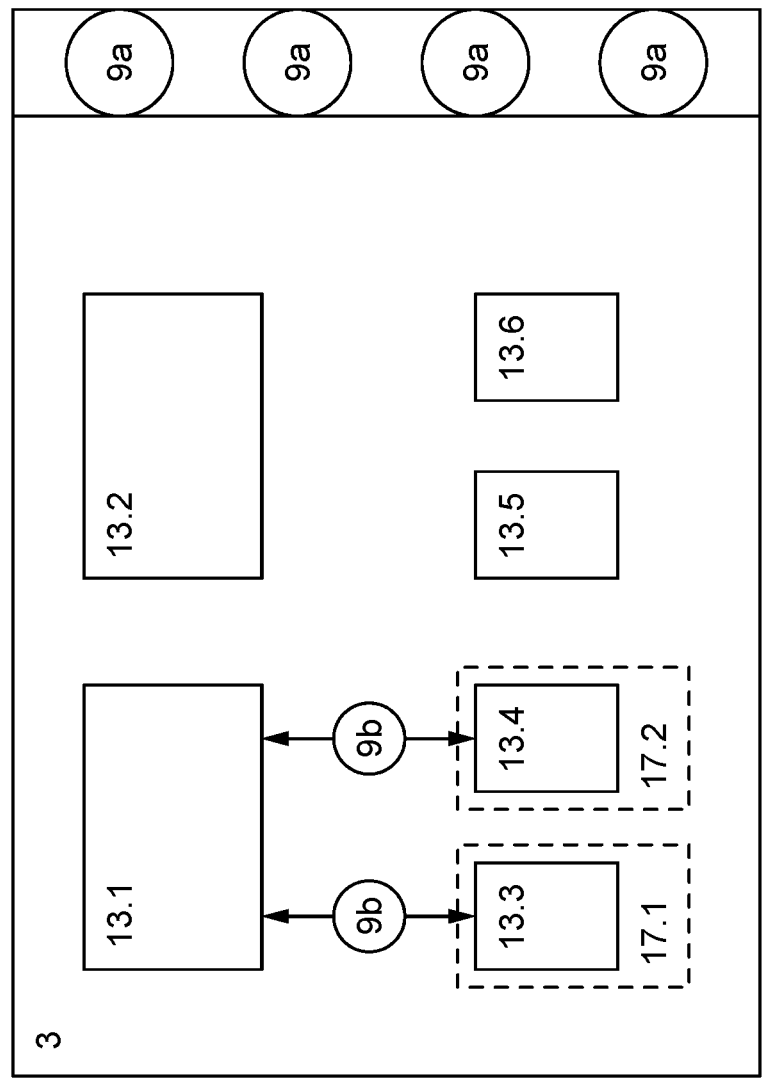
FIG. 4 schematically shows the mapping of the electronic control device according to FIG. 3 to a virtual control device.

FIGS. 3 and 4 show a variant of method 1, in which electronic control device 2 according to FIG. 3 is transferred to a corresponding virtual control device 3. The special feature here is that multiple computing unit 6a of the identical type of electronic control device 2, i.e., processors (CPU), microcontrollers (μC), graphics processors (GPU), field programmable gate arrays (FPGA), neural network accelerators (NNA), and matrix accelerators (MACC), are mapped to exactly one virtual computing subunit 13.1, 13.2, 13.3, 13.4, 13.5, and 13.6 of this type, in fact all computing units 6a of the identical type of electronic control device 2 have been mapped to exactly one computing subunit 13 of this type. Based on the dashed box, FIG. 3 shows which computing units 6a of the identical type of electronic control device 2 are mapped to which virtual computing subunits 13.

FIG. 4 shows resulting virtual control device 3. For reasons of clarity, the internal functionalities of electronic control device 2 and the internal functionalities of virtual control device 3 are not expressly illustrated. It is apparent in FIG. 4 which computing subunits 13.1 and 13.3 as well as 13.1 and 13.4 are exchanging data via (internal) data transfer functionalities 9b.

FIG. 4 furthermore shows that the transfer of the internal functionality of mapped computing unit 6a of the types graphics processor (GPU) and field programmable gate array (FPGA) of electronic control device 2 to an internal functionality of virtual computing subunits 13.3, 13.4 executable on simulator computing unit 5 comprises the use of a simulation module 17.1, 17.2, executable on simulator computing unit 5, for the mapped computing units of the types graphics processor (GPU) and field programmable gate array (FPGA) of electronic control device 2. The code for programming special chips of this type is not readily transferable to a simulator computing unit 5 or implementable with the aid of the means of software configuration 10 of simulator computing unit 5. The manufacturers of the special type of computing units frequently offer simulators for standard computers, which permit the code of the special type of computing units to be executed on these standard computers. Tools of this type are used here as aforementioned simulation modules 17.1, 17.2.

When carrying out method 1, it happens that internal function f_i of internal functionality 7a2 of second computing unit 6a2 called by internal functionality 7a1 of first computing unit 6a1 relates to the loading or storage of data from or to the memory area of second computing unit 6a2 (cf. FIG. 2 in general). If first computing unit 6a1 is, for example, a processor (CPU) and second computing unit 6a2 is, for example, an accelerator, regardless of the type, the call could be as follows, based on the example of a pseudo code:

---

First computing unit 6a1 (CPU):

...
//Notification of data to be processed "source"
CopyToAccelerator(Source[ ])

-continued

```
//Start internal function (kernel) on second computing unit
//(accelerator) indicating result location "target"
runAccelerator(Target[ ], kernel)
...
/* Release control */
...
listenOrWaitFor accelerator
//Copy result of target for continued availability to
//first computing unit 6a1
CopyFromAccelerator(Target)
Second computing unit 6a2 (accelerator):
//Function "kernel" on the accelerator
function kernel(in ,out):
    do something with (in)
    assign result to out
```

The commands used on first computing unit $6a1$, i.e., on the CPU, for accessing the functionality of second computing unit $6a2$ are often provided by a software development environment of the manufacturer of second computing unit $6a2$, i.e., the accelerator in this case. The exchange of data between the computing units may take place, for example, via a shared memory, to which both computing units $6a1$, $6a2$ have access.

The example of the interaction between different computing units $6a1$, $6a2$ based on the pseudo code is sensible because it gets across the fact that method 1 carries out evaluation 14 of provided internal functionalities $7a1$, $7a2$, $7a3$ of first computing unit $6a1$ and second computing unit $6a2$, and also third computing unit $6a3$ on the basis of the binary code of internal functionalities $7a1$, $7a2$, $7a3$, which is executable on electronic control device 2, and/or on the basis of the high-level language source code of internal functionalities $7a1$, $7a2$, $7a3$. In the illustrated example, evaluation 14 takes place with the aid of an analysis tool, which analyzes the source code. This automatic analysis tool has knowledge of corresponding functions, which effectuate a data transfer or a call of internal functionalities $7a1$, $7a2$, $7a3$ in a computing unit $6a1$, $6a2$, $6a3$. In the above example, the analysis tool implementing evaluation 14 must therefore search the source code for the commands "CopyToAccelerator" and "runAccelerator," among other things.

Figure 5:
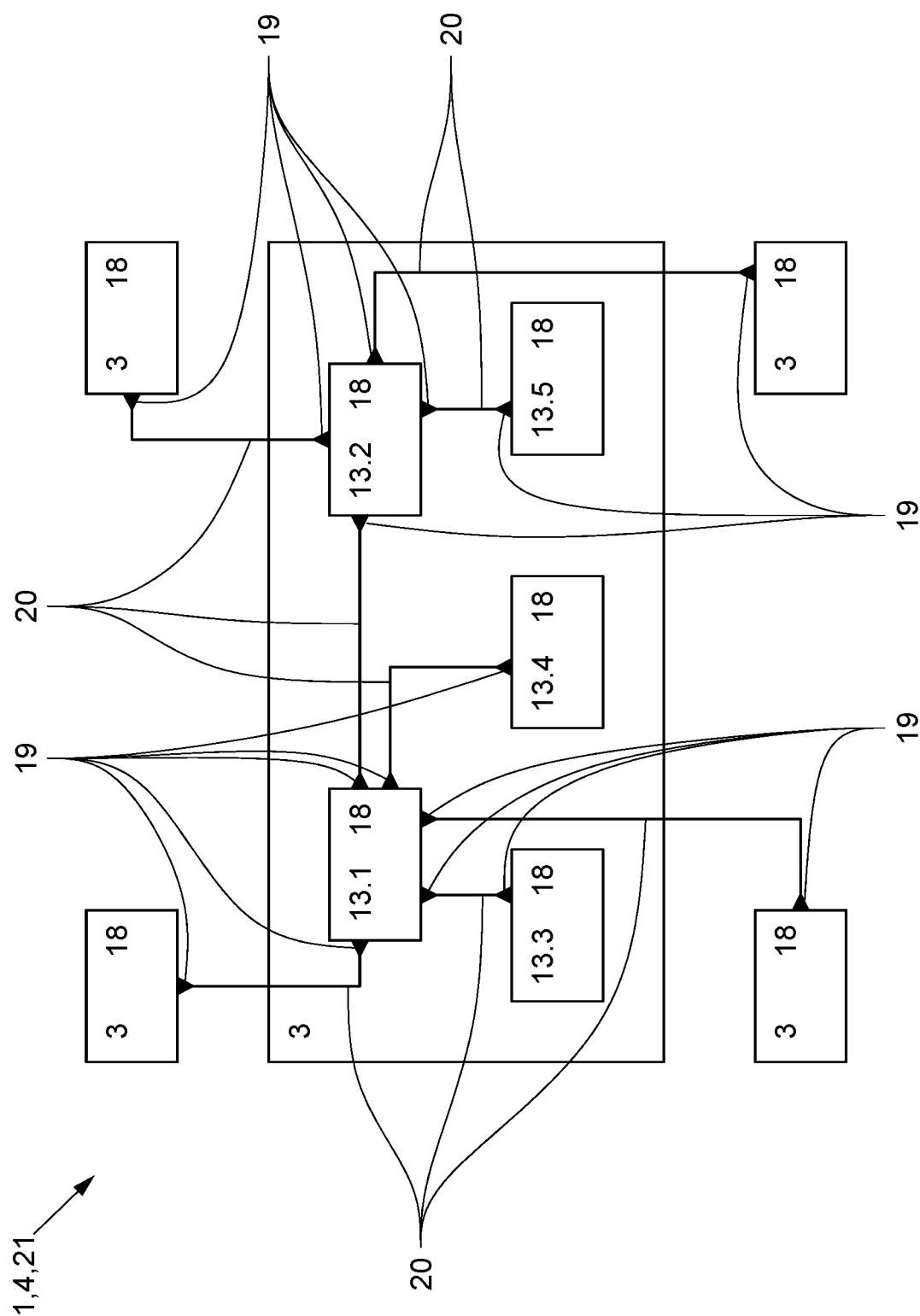
FIG. 5 schematically shows a network of five virtual control devices, of which one virtual control device includes multiple virtual computing subunits.

FIG. 5 shows that, in the case of method 1 and simulator 4, it is also provided, in particular, that for a computer-based graphical simulation environment 21, in particular of simulator 4, each virtual computing subunit 13.1, 13.2 13.3. 13.4, 13.5 is represented as block 18, as is known from block diagram representations.

FIG. 5 shows a network of five virtual control devices 3, of which the illustrated central virtual control device 3 includes multiple virtual computing subunits 13.1, 13.2, 13.3, 13.4, 13.5. FIG. 5 also shows that blocks 18 of virtual computing subunits 13.1, 13.2, 13.3, 13.4, 13.5, which virtual computing subunits 13.1, 13.2, 13.3, 13.4, 13.5 have been recognized as being connected to each other in a data exchange, are identified by data transfer ports 19 at corresponding blocks 18, the data transfer being identified by a signal line 20 connecting data transfer ports 19 of virtual computing subunits 13.1, 13.2, 13.3, 13.4, 13.5.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A method to test at least one electronic control device as a virtual control device on a simulator, which includes at least one simulator computing unit, the electronic control device having a hardware configuration with at least one computing unit and an external interface for exchanging data, and a software configuration assigned to the hardware configuration, the software configuration comprising an internal functionality and an external interface functionality, the method comprising:
    mapping the electronic control device to the virtual control device in that the internal functionality of the software configuration of the electronic control device is taken over as the internal functionality of a software configuration of the virtual control device, and the external interface functionality of the electronic control device is replaced by a data transfer functionality of the software configuration of the simulator computing unit,
    translating the software configuration of the virtual control device into executable code for the simulator computing unit;
    executing the translated software configuration on the simulator;
    providing the hardware configuration of the electronic control device with at least one first computing unit and a second computing unit of different types, the software configuration of the electronic control device comprising at least internal functionalities for the first computing unit and the second computing unit;
    calling, via at least the internal functionality of the first computing unit, an internal function of the internal functionality of the second computing unit;
    providing a description of the hardware configuration and the software configuration of the electronic control device, including an assignment of the internal functionalities of the software configuration of the electronic control device to the computing units of the electronic control device;
    providing the internal functionalities of the computing units of the electronic control device;
    mapping, via an evaluation of the description of the electronic control device, each computing unit of each type of electronic control device, including an assigned internal functionality, to a virtual computing subunit of the corresponding type;
    transferring the internal functionality of the electronic control device of the mapped computing unit to an internal functionality of the virtual computing subunit executable on the simulator computing unit;
    evaluating the provided internal functionalities of the first computing unit of the electronic control device and the second computing unit of the electronic control device to ascertain which computing units of the electronic control device are exchanging data with each other by accessing an internal function of another computing unit of the electronic control device; and
    replacing the accesses to internal functions of another computing unit in the virtual control device by a data transfer functionality of the software configuration of the simulator computing unit.

2. The method according to claim 1, wherein different types of computing units of the electronic control device include: processors (CPU), microcontrollers (μC), graphics processors (GPU), field programmable gate arrays (FPGA), neural network accelerators (NNA), matrix accelerators (MACC), or security chips.

3. The method according to claim 1, wherein multiple computing units of the identical type of the electronic control device are mapped to exactly one virtual computing subunit of this type or all computing units of the identical type of the electronic control device are mapped to exactly one virtual computing subunit of this type.

4. The method according to claim 1, wherein the transfer of the internal functionality of the mapped computing unit of the electronic control device to an internal functionality of the virtual computing subunit, which is executable on the simulator computing unit, comprises using a simulation module, executable on the simulator computing unit, for the mapped computing unit of the electronic control device.

5. The method according to claim 1, wherein the internal function of the internal functionality of the second computing unit called by the internal functionality of the first computing unit relates to the loading or storage of data from or to the memory area of the second computing unit.

6. The method according to claim 1, wherein the evaluation of the provided internal functionalities of the first computing unit and the second computing unit of the electronic control device takes place on the basis of the binary code of the internal functionalities, which is executable on the electronic control device, and/or on the basis of the high-level language source code of the internal functionalities.

7. The method according to claim 1, wherein each virtual computing subunit is represented as a block for a computer-based graphical simulation environment of the simulator.

8. The method according to claim 7, wherein the blocks of the virtual computing subunits, which virtual computing subunits have been recognized as being connected to each other in a data exchange, are identified by data transfer ports at the corresponding blocks, the data transfer being identified by a signal line connecting the data transfer ports of the virtual computing subunits.

9. A system for testing at least one electronic control device as a virtual control device on a simulator, the system comprising:
   the simulator;
   a hardware configuration; and
   a software configuration assigned to the hardware configuration of the electronic control device,
   wherein the simulator comprises at least one simulator computing unit,
   wherein the hardware configuration of the electronic control device comprises at least one computing unit and an external interface for exchanging data,
   wherein the software configuration comprises an internal functionality and an external interface functionality,
   wherein the electronic control device is mapped to the virtual control device by the simulator in that the internal functionality of the software configuration of the electronic control device is taken over as the internal functionality of a software configuration of the virtual control device,
   wherein the external interface functionality of the electronic control device is replaced by a data transfer functionality of a software configuration of the simulator computing unit,
   wherein the software configuration of the virtual control device is translated into executable code for the simulator computing unit and executed on the simulator in the operating state of the simulator,
   wherein the hardware configuration of the electronic control device includes at least one first computing unit and a second computing unit of different types, the software configuration of the electronic control device comprises at least internal functionalities for the first computing unit and the second computing unit, at least the internal functionality of the first computing unit calling an internal function of the internal functionality of the second computing unit;
   wherein the simulator receives a description of the hardware configuration and the software configuration of the electronic control device, including the assignment of the internal functionalities of the software configuration of the electronic control device to the computing units of the electronic control device and the internal functionalities of the computing units of the electronic control device itself;
   wherein the simulator maps each computing unit of each type of electronic control device, including an assigned internal functionality, to a virtual computing subunit of the corresponding type by evaluating the description of the electronic control device, the internal functionality of the electronic control device of the mapped computing unit being transferred to an internal functionality of the virtual computing subunit executable on the simulator computing unit, and
   wherein, by evaluating the provided internal functionalities of the first computing unit of the electronic control device and the second computing unit of the electronic control device, the simulator ascertains which computing units of the electronic control device are exchanging data with each other by accessing an internal function of another computing unit of the electronic control device, and the accesses to internal functions of another computing unit are replaced in the virtual control device by a data transfer functionality of the software configuration of the simulator computing unit.

10. A system comprising a simulator, wherein a simulator computing unit of the simulator is programmed with a program such that it carries out the method according to claim 1 when the program is executed.

11. A simulator comprising a simulator computing unit for testing an electronic control device as a virtual control device, the simulator having a data transfer functionality and a software configuration of the simulator computing unit, wherein the simulator computing unit is programmed with a program such that it carries out the method according to claim 1 when the program is executed.

12. A non-transitory computer readable medium storing a computer program, comprising commands, which, when the program is executed by a simulator computing unit of a simulator, prompt the simulator to carry out the method according to claim 1.

* * * * *